Oct. 21, 1930.                B. F. EAKIN                1,778,786

SHOCK ABSORBER AND SNUBBER

Filed Jan. 14, 1926

B. F. Eakin
    INVENTOR.

ATTORNEYS.

Patented Oct. 21, 1930

1,778,786

UNITED STATES PATENT OFFICE

BENJAMIN F. EAKIN, OF KAHOKA, MISSOURI

SHOCK ABSORBER AND SNUBBER

Application filed January 14, 1926. Serial No. 81,298.

Most shock absorbing and rebound springs which are now in use are applied to the usual automobile body supporting springs in order to conform to the contour thereof and such shock absorbing and rebound springs have been found not to give the desired results when so positioned, though they do absorb the shocks and rebound actions.

Therefore, the present invention has for its purpose to provide a shock absorbing and rebound spring which, though curved, is positioned with its curvature opposite the curvature of the usual body supporting spring, the ends of this shock absorbing and rebound spring being connected to shackles which engage on opposite edges of the body supporting spring and are, in turn, connected to an additional shock absorbing and rebound spring which does conform to the body supporting spring.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
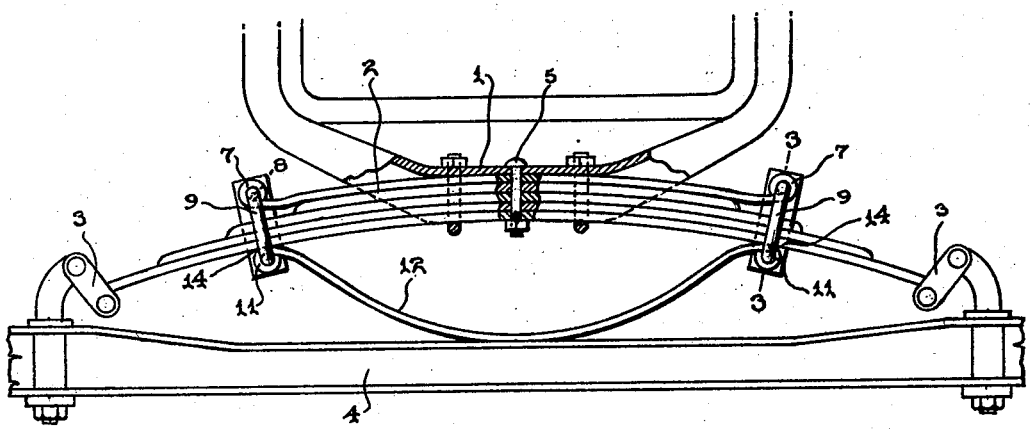
Figure 1 is a view in front elevation of the lower part of an automobile, sufficient to show the radiator and the body supporting spring and the front axle, illustrating the improved shock absorber and snubber as applied.
Figure 2:
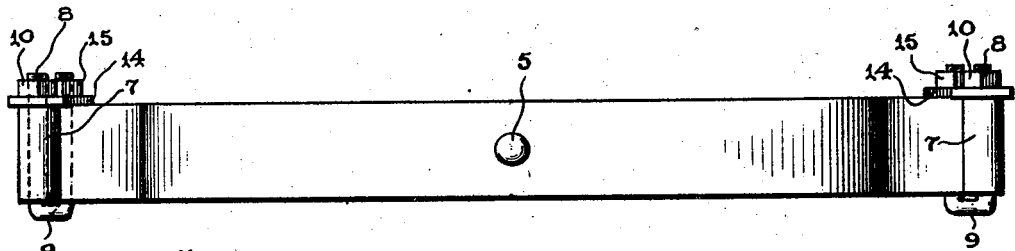
Figure 2 is a plan view of the shock absorber and snubber.
Figure 3:
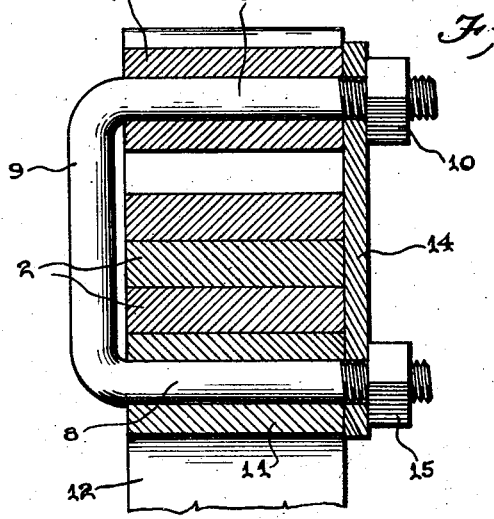
Figure 3 is a cross sectional view on line 3—3 of Figure 1.

Referring to the drawings, 1 designates the seat or bracket which supports the radiator of the automobile and to which the usual body supporting spring 2 is operatively connected. The body supporting spring 2 is, in turn, connected to the usual tilting shackles 3 which are mounted upon the front axle 4 of the automobile, particularly one of the Ford type.

Interposed between the body supporting spring and the bottom of the channel of the bracket 1 is an auxiliary shock absorbing and rebound spring and which, for the greater part of its length, conforms to the body supporting spring, there being means 5 passing through the two springs to assist in holding them in place and connected. The end portions of the auxiliary shock absorbing and rebound spring are turned up slightly, as shown, and terminate in rolls 7 to receive certain of the legs 8 of the shackles 9. These shackles 9 are U-shaped and the legs which pass through the rolls of the auxiliary shock absorbing and rebound spring have nuts 10 thereon.

The other legs of the shackles pass through rolls 11 formed at the ends of the dominant shock absorbing and rebound spring 12 which is disposed so that its curvature is just opposite to the curvature of the body supporting spring and the auxiliary shock absorbing and rebound spring. The legs of both shackles pass through plates 14 which are arranged to engage the other edges of the body supporting spring, and the legs which pass through the rolls on the ends of the dominant shock absorbing and rebound spring also have nuts 15.

It is to be noted that the wheels of the automobile in passing over irregularities in the road-bed register vibrations to the front axle which transmits shocks to the body supporting spring. However, with the present invention the dominant shock absorbing and rebound spring acts to withstand and absorb the shocks efficiently as well as the rebound action while the auxiliary shock absorbing and rebound spring assists materially in withstanding the rebound actions and absorbing the shocks. In other words, as the wheels of the automobile acommodate themselves to the irregularities of the road-bed registering shocks to the body supporting spring, said spring tends to flatten out due to such action, the auxiliary shock absorbing and rebound spring likewise tending to flatten, its partially upturned ends cooperating with the main shock absorbing and rebound spring, tending to bow the latter and acting to absorb all shocks and rebound actions.

The invention having been set forth, what is claimed is:

The combination with a body supporting spring, of an auxiliary shock absorbing and rebound spring conforming to and engaging the body supporting spring, a dominant shock absorbing and rebound spring disposed with its curvature reverse to the curvature of the body supporting spring, shackles straddling the body supporting spring and connecting the ends of the dominant and auxiliary shock absorbing and rebound springs, said shackles comprising U-shaped members straddling the body supporting spring, the ends of the dominant and auxiliary shock absorbing and rebound springs having rolls to receive the legs of the U-shaped members, and plates secured on the legs of the U-shaped members to retain the ends of the dominant and auxiliary shock absorbing and rebound springs in position.

In testimony whereof he affixes his signature.

BENJAMIN F. EAKIN.